(12) United States Patent
Corbel et al.

(10) Patent No.: US 6,562,875 B1
(45) Date of Patent: May 13, 2003

(54) AQUEOUS DEFOAMER COMPOSITION

(75) Inventors: Gilles Corbel, Lanchatre (FR); James J. Svarz, Naperville, IL (US); Alan Smith, Cheshire (GB)

(73) Assignee: Ondeo Nalco Company, Naperville, IL (US)

( * ) Notice: Subject to any disclaimer, the term of this patent is extended or adjusted under 35 U.S.C. 154(b) by 0 days.

(21) Appl. No.: 09/945,460

(22) Filed: Aug. 30, 2001

(51) Int. Cl.⁷ ............................................... B01D 19/04
(52) U.S. Cl. .................... 516/56; 516/134; 516/133; 516/126; 516/58; 516/63; 162/158; 162/179
(58) Field of Search .................. 516/133, 134, 516/FOR 163, 56, 126, 58, 63; 510/506; 162/158, 179

(56) References Cited

U.S. PATENT DOCUMENTS

| | | | | |
|---|---|---|---|---|
| 4,009,119 A | | 2/1977 | Poschmann et al. ......... | 516/132 |
| 4,405,490 A | * | 9/1983 | Maas et al. .................. | 516/133 |
| 4,791,097 A | * | 12/1988 | Walele et al. ............... | 516/133 |
| 5,261,927 A | * | 11/1993 | Walger et al. .............. | 516/116 |
| 5,728,320 A | * | 3/1998 | Fiocco et al. ................ | 516/58 |
| 5,998,352 A | * | 12/1999 | Vlasblom ................... | 510/365 |
| 6,369,016 B1 | * | 4/2002 | Vlasblom ................... | 510/365 |

FOREIGN PATENT DOCUMENTS

| | | | | |
|---|---|---|---|---|
| DE | 1 593 369 | * | 10/1969 | |
| DE | 25 32 888 | | 2/1977 | |
| JP | 50-104207 | * | 8/1975 | ........ 516/FOR 163 |
| JP | 353-134785 A | * | 11/1978 | ........ 516/FOR 163 |
| JP | 360-007909 A | * | 1/1985 | ........ 516/FOR 163 |

OTHER PUBLICATIONS

Database Derwent on EAST, week 197707, London: Derwent Publications Ltd., AN 1977–11313Y, DE 2532888 A, (BASF AG) abstract.*

Database Derwent on EAST, week 196800, London: Derwent Publications Ltd., AN 1968–22160Q, DE 1593369 A, (Bolidt Mij Tot Exploitatie Van) abstract.*

* cited by examiner

*Primary Examiner*—Daniel S. Metzmaier
(74) *Attorney, Agent, or Firm*—Michael B. Martin; Thomas M. Breininger

(57) ABSTRACT

An aqueous emulsion containing from about 0.1 to about 70 weight percent of a mixture of a) one or more alkoxylated alcohols of formula $$RO(C_2H_4O)_x(C_3H_6O)_yZ$$

wherein R is straight or branched $C_4$–$C_{40}$ alkyl; x is 0 to about 25; y is less than 1 to about 50 and Z is H or the residue of an organic acid, and b) an effective emulsifying amount of one or more anionic surfactants and use of the emulsion to inhibit foaming in papermaking processes.

13 Claims, No Drawings

AQUEOUS DEFOAMER COMPOSITION

TECHNICAL FIELD

This invention concerns a stable aqueous emulsion of a mixture of one or more alkoxylated alcohols and one or more anionic surfactants and use of the emulsion to inhibit foaming in papermaking processes.

BACKGROUND OF THE INVENTION

In the manufacture of paper, a cellulosic pulp is first created and then used to make paper. In most cases, undesirable foaming of the process results from the presence of either naturally occurring surface active components that result from the pulping operation or by the use of many of the additives used in development of papers with the desired end use properties. Some examples of naturally occurring surface active components are lignins and fatty and resin acid salts. Some examples of additives used in the papermaking process include starches, fillers, latex binders, wet strength agents and the like. Many of these components either assist in the stabilization of foams or may themselves be contributors to the formation of foams.

Foaming of the cellulosic pulp slurries can be problematic in the manufacture of the finished paper and may impact production and quality of the finished paper. Production of the finished paper may be impeded by the presence of small bubbles within the forming sheet which may impede the removal of water in the sheet. Other production related difficulties occur when the process tanks and pipes used to transport the cellulosic pulp slurry contain substantial amounts of air. The air causes the capacity of the equipment to be compromised since it takes up volume in the equipment meant to handle the cellulosic slurry. The presence of bubbles in the sheet may also cause voids in the continuity of the sheet or may alter the porosity or smoothness of the sheet which are quality aspects generally considered detrimental.

As a result of the foam present during the manufacture of paper, many types of foam abating formulations have been used. Alkoxyalkylated alcohol foam inhibitors are described in German Patent Nos. 2,532,888 and 1,595,369. Neither of these references, however, describes emulsification of the alkoxylalkylated alcohols in water using anionic surfactants.

SUMMARY OF THE INVENTION

In its principal aspect, this invention is directed to an aqueous emulsion containing from about 0.1 to about 70 weight percent of a mixture of a) one or more alkoxylated alcohols of formula $$RO(C_2H_4O)_x(C_3H_6O)_yZ$$

wherein R is straight or branched $C_4$–$C_{40}$ alkyl; x is 0 to about 25; y is less than 1 to about 50 and Z is H or the residue of an organic acid, and b) an effective emulsifying amount of one or more anionic surfactants.

DETAILED DESCRIPTION OF THE INVENTION

"Alcohol alkoxy sulfate" means a compound of formula $R_3O(R_4CH_2CH_2O)_nSO_3M$ where $R_3$ is $C_8$ to $C_{18}$ alkyl, M is selected from the group consisting of sodium, potassium, magnesium, ammonium, alkanolamine or H, and $R_4$ is absent or $CH_2$. A representative alcohol sulfate is ammonium lauryl ether sulfate.

"Alcohol sulfate" means a compound of formula $R_3OSO_3M$, where $R_3$ is $C_8$ to $C_{18}$ alkyl. The alcohol sulfates exist either in the salt form, where M is selected from the group consisting of sodium, potassium, magnesium, ammonium, alkanolamine or H. Representative alcohol sulfates include sodium dodecyl sulfate, sodium tetradecyl sulfate, ammonium lauryl sulfate, magnesium lauryl sulfate, cetyl sulfate, octyl sulfate nonyl sulfate, decyl sulfate, and 4-undeconal, 7-ethyl-2-methyl-sulfate, sodium salt (Niaproof Anionic Surfactant 4, available from Niacet Corporation, Niagra Falls, N.Y.).

"Alkoxylated alcohol" means a compound of formula $$RO(C_2H_4O)_x(C_3H_6O)_yZ$$

wherein R is straight or branched $C_4$–$C_{40}$ alkyl; x is 0 to about 25; y is less than 1 to about 50 and Z is H or the residue of an organic acid.

The alkoxylated alcohols are prepared by reacting a $C_4$–$C_{40}$ alkyl alcohol, or mixture of $C_4$–$C_{40}$ alkyl alcohols, both designated herein as ROH, with propylene oxide, and optionally ethylene oxide. The ethylene oxide and propylene oxide may be added in random or block fashion. The resulting alkoxylated alcohol is sparingly soluble or insoluble in water.

Random addition of ethylene oxide and propylene oxide involves both components being added to the alcohol simultaneously, such that the rate of addition to the alcohol is controlled by their relative amounts and reaction rates. Thus, in the case of random addition, it is understood the above formula is not a structural formula but rather is representative only of the molar amounts, x and y, of ethylene oxide and propylene oxide that are added to the alcohol ROH.

In the case of block addition, either the ethylene oxide or propylene oxide is added first to the alcohol and allowed to react. The other component is then added and allowed to react. In the case of block addition, the above formula is representative of the structure of the alkoxylated alcohol, except that the $(C_2H_4O)_x$ and $(C_3H_6O)_y$ groups may be reversed depending on whether the propylene oxide or ethylene oxide is added first.

In an aspect, R is straight or branched $C_8$–$C_{22}$ alkyl; x is 0 to about 5; and y is less than 1 to about 25.

In another aspect, the alkoxylated alcohol has the following formula:

$$R_1R_2CHCH_2O(C_2H_4O)_x(C_3H_6O)_yZ$$

where $R_1$ and $R_2$ are independently $C_6$–$C_{18}$ alkyl and x, y and Z are defined above.

The preparation of representative alkoxylated alcohols is described in German Patent nos. 2,532,888 and 1,593,369.

"Alkyl" means a monovalent group derived from a straight or branched chain saturated hydrocarbon by the removal of a single hydrogen atom.

"Anionic surfactant" means any anionically-charged surface active agent suitable for stabilizing an emulsion in water of an alkoxylated alcohol. Representative anionic surfactants include, but are not limited to alcohol sulfates, alcohol alkoxy sulfates, polyoxyalkylene phosphate esters and dialkyl sulfosuccinates, sulfosuccinic acid esters with ethoxylated alcohols. The anionic surfactants are available commercially or can be readily manufactured using techniques known in the art. Polyoxyalkylene phosphate esters are preferred. A preferred polyoxyalkylene phosphate ester is the phosphate ester of ethoxylated tridecyl alcohol.

"Dialkyl sulfosuccinate" means a compound of formula $R_9OOCCH_2(SO_3M)COOR_{10}$, where $R_9$ and $R_{10}$ are independently selected from amyl, octyl(2-ethyl hexyl), isobutyl, tridecyl, and lauryl and M is as defined herein. A representative dialkyl sulfosuccinate is dioctylsulfosuccinate.

"Emulsion" means a stable, microscopically heterogeneous mixture of two normally immiscible liquid phases, in which one of the liquids forms minute droplets suspended in the other liquid.

"Phosphate ester" means a compound of the general formula $R_3OPO_3H_2$ or $R_3OPO_3R_5H$, where $R_3$ and $R_5$ are independently $C_8$ to $C_{18}$ alkyl.

"Polyoxyalkylene phosphate ester" means a compound of formula

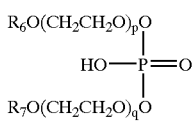

(1)

and/or

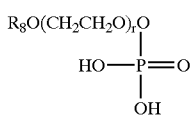

(2)

wherein $R_6$, $R_7$ and $R_8$ are independently $C_8$ to $C_{18}$ alkyl. Anionic surfactants of the polyoxyalkylene phosphate ester chemistry are complex mixtures and the amount of each type present, i.e., (1), (2), depend upon the process and stoichiometry used with the starting materials.

"Residue of an organic acid means a group of formula— C(O)R' where R' is $C_1$–$C_4$ alkyl.

"Sulfosuccinic acid ester with ethoxylated alcohols" means a compound of formula: $R_{11}(OCH_2CH_2)rOCH(SO_3M)CH_2COOM$ where $R_{11}$ is $C_8$–$C_{18}$ alkyl, r is an integer from 1 to about 10, and M is as defined herein. A representative sulfosuccinic acid ester with ehoxylated alcohol is laureth sulfosuccinate (Schercopol LPS available from Scher Chemicals, Inc., Clifton, N.J.).

The emulsions of this invention contain from about 0.1 to about 70, preferably from about 0.5 to about 20 percent, based on the total weight of the emulsion, of a mixture of one or more alcohol alkoxylates and an effective emulsifying amount of anionic surfactant. The amount of anionic surfactant suitable for preparing a stable emulsion is readily determined empirically by one of ordinary skill in the art. Typically, the amount of anionic surfactant used is between about 0.01 percent and about 10 percent by weight of the alkoxylated alcohol.

The emulsion is prepared by adding an alkoxylated alcohol/anionic surfactant mixture to water and mixing until the desired emulsion is obtained. The mixing may be accomplished by any suitable means such as swirling, stirring or shaking or by mechanically shearing the mixture using a blender, homogenizer, pump, colloid mill, in line mixer, static mixer, propeller, and the like. The emulsion is analyzed by microscopy and/or a particle size analyzer as is known in the art. Typically, the emulsion of this invention has a particle size of from about 2 to about 10 μm.

Preferably, the emulsion is prepared on-site immediately prior to adding to the cellulosic pulp slurry. On-site manufacture of the emulsion allows for easy dosage control and avoids problems generally associated with water-based defoamer compositions due to long storage times and cold temperatures.

In another aspect, this invention is directed to a method of inhibiting foaming in a papermaking process comprising adding to the pulp slurry prior to sheet formation an effective amount of an aqueous emulsion containing from about 0.1 to about 70 weight percent of a mixture of a) one or more alkoxylated alcohols of formula

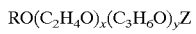

wherein R is straight or branched $C_4$–$C_{40}$ alkyl; x is 0 to about 25; y is less than 1 to about 50 and Z is H or the residue of an organic acid, and b) an effective emulsifying amount of one or more anionic surfactants.

The amount of emulsion effective to inhibit foaming may be empirically determined by one of ordinary skill in the art of papermaking, based on the characterstics of the pulp slurry being treated. Typically, from about 0.01 lb/ton to about 5.0 lb/T, based on polymer solids, of the aqueous emulsion is added to the pulp slurry.

The foregoing may be better understood by reference to the following examples, which are presented for purposes of illustration and are not intended to limit the scope of this invention.

EXAMPLE 1

Preparation of a $C_{14}$–$C_{18}$ Alcohol Alkoxylate

A mixture containing 12.3 percent of a mixture of molten $C_{14}$–$C_{18}$ alcohol 0.4 percent of KOH is sealed in a reactor and heated to about 110–150° C. After the mixture is essentially free of water, 82.7 percent of propylene oxide is slowly added maintaining a pressurized condition. After the propylene oxide is consumed, 4.3 percent of ethylene oxide is slowly added to the reactor. When the reaction is completed, the mixture is neutralized with acetic acid. The resulting product is a clear to slightly hazy liquid.

EXAMPLE 2

Preparation of a $C_{18}$ Alcohol Alkoxylate

Molten $C_{18}$ alcohol (231.7 g) is charged to a round bottomed flask equipped with a nitrogen sparge, stirrer and heating mantle. The nitrogen sparge is maintained and 8.03 g of a 45% aqueous solution of KOH is added to the flask. The flask is heated and maintained above the boiling point of water in order to assist in the dehydration. When the water content is below 0.05 percent as determined by a Karl Fischer water analysis, 97.24 g of the mixture is charged to a reactor and the reactor is purged with nitrogen, heated and sealed. Propylene oxide (472 g) is added to the reactor while maintaining 10–100 psi pressure in the reactor. After all of the propylene oxide has been consumed, the reaction mixture is allowed to cool and is neutralized with acetic acid in order to reduce the pH and to minimize further reactivity. The resulting product contains about 83 percent propylene oxide and 17 percent of $C_{18}$ alcohol.

EXAMPLE 3

Preparation of $C_{14}$–$C_{18}$ Alcohol Alkoxylate/0.6% Ethoxylated Tridecyl Alcohol Phosphate Ester To the $C_{14}$–$C_{18}$ alcohol alkoxylate of EXAMPLE 1 is added 0.6 percent by weight of ethoxylated tridecyl alcohol phosphate ester and the mixture and is mixed to ensure uniformity.

EXAMPLE 4

Preparation of $C_{18}$ Alcohol Alkoxylate/0.6% Ethyoxylated Tridecyl Alcohol Phosphate Ester To the $C_{18}$ alcohol alkoxylate of EXAMPLE 2 is added 0.6% of ethoxylated tridecyl alcohol phosphate ester and the mixture is mixed to ensure uniformity.

EXAMPLE 5

Preparation of $C_{14}$–$C_{18}$ Alcohol Alkoxylate/0.6% Ethoxylated Lauryl Alcohol Sulfuric Acid Ester, Sodium Salt The mixture is prepared according to the method of EXAMPLE 3, except substituting ethoxylated lauryl alcohol sulfuric acid ester, sodium salt for ethoxylated tridecyl alcohol phosphate ester.

EXAMPLE 6

Preparation of $C_{14}$–$C_{18}$ Alcohol Alkoxylate/0.6% Ethoxylated Tridecyl Alcohol Phosphate Ester The mixture is prepared according to the method of EXAMPLE 1, except using 0.9 percent by weight of ethoxylated tridecyl alcohol phosphate ester.

EXAMPLE 7

Preparation of $C_{14}$–$C_{18}$ Alcohol Alkoxylate/0.6% Sodium Dioctyl Sulfosuccinate The mixture is prepared according to the method of EXAMPLE 3, except substituting sodium dioctyl sulfosuccinate for ethoxylated tridecyl alcohol phosphate ester.

EXAMPLE 8

Preparation of Aqueous Emulsions

Each of the mixtures prepared in examples 3–7 are emulsified as follows.
1. 28 grams of the separate mixtures represented by examples 1–7 are added to a blender jar.
2. 252 grams of water are added to the blender jar containing the mixtures.
3. The samples are blended for 90 seconds (Oster brand OSTERIZER 14 speed blender, available from VWR Scientific Products, City, State, set to high speed, ice chop). The resulting emulsions are tested for antifoam performance as described in EXAMPLE 9.

EXAMPLE 9

Measurement of Antifoaming Performance

The antifoaming performance of the aqueous alkoxylated alcohol emulsions of this invention is measured as follows.

One liter of dilute black liquor is placed in a graduated column. The black liquor is heated to test temperature by a recirculation pump and a stream of the black liquor is directed downward through the graduated column. The impinging action of the stream generates foam.

The resulting foam height (cm.) versus time (sec.) data is measured for the emulsions of the alcohol ethoxylates prepared in EXAMPLE 3–6. The lower the foam height in centimeters, the better the antifoaming activity.

The emulsions prepared from the alkoxylated alcohol/anionic surfactant mixtures of EXAMPLES 3–6 show a 20–40 percent increase in antifoaming efficiency compared to corresponding unemulsified defoamer compositions.

Although this invention has been described in detail for the purpose of illustration, it is to be understood that such detail is solely for that purpose and that numerous modifications, alterations and changes can be made therein by those skilled in the art without departing from its spirit and scope. All changes which come within the meaning and range of equivalency of the claims are to be embraced within their scope.

We claim:

1. An aqueous emulsion containing from about 0.1 to about 70 weight percent of a mixture of
   a) one or more alkoxylated alcohols of formula $$RO(C_2H_4O)_x(C_3H_6O)_yZ$$

wherein R is straight or branched $C_8$–$C_{22}$ alkyl; x is 0 to about 25; y greater than 0 to about 50 and Z is H or a th residue of an organic acid of a formula—C(O)R', where R' is $C_1$–$C_4$ alkyl, and
   b) an effective emulsifying amount of one or more anionic surfactants, wherein the amount of anionic surfactants used is between about 0.01 and 10 percent by weight of the alkoxylated alcohol and said one or more anionic surfactants is selected from the group consisting of alcohol sulfates, alkyl alkoxy sulfates, Polvoxvalkylene Phosphate esters, dialkyl sulfosuccinates, and sulfosuccinic acid esters with ethoxylated alcohols.

2. The composition of claim 1 wherein the alkoxylated alcohol has formula $$R_1R_2CHCH_2O(C_2H_4O)_x(C_3H_6O)_yZ$$

where $R_1$ and $R_2$ are independently $C_6$–$C_{18}$ alkyl; x is 0 to about 25; y is greater than 0 to about 50 and Z is H or the residue of an organic acid.

3. The composition of claim 1 wherein R is straight or branched $C_8$–$C_{22}$ alkyl; x is 0 to about 5; and y is greater than 0 to about 25.

4. The composition of claim 1 containing from about 0.5 to about 20 weight percent of the mixture of alkoxylated alcohols and anionic surfactants.

5. An aqueous emulsion containing from about 0.1 to about 70 weight percent of a mixture of
   a) one or more alkoxylated alcohols of formula $$RO(C_2H_4O)_x(C_3H_6O)_yZ$$

wherein R is straight or branched $C_8$–$C_{22}$ alkyl; x is 0 to about 25; y greater than 0 to about 50 and Z is H or the residue of an organic acid, and
   b) an effective emulsifying amount of one or more polyoxyalkylene phosphate esters.

6. The composition of claim 5 wherein the polyoxyalkylene phosphate ester is the phosphate ester of ethoxylated tridecyl alcohol.

7. A method of inhibiting foaming in a papermaking process comprising adding to the pulp slurry prior to sheet formation an effective amount of an aqueous emulsion containing from about 0.1 to about 70 weight percent of a mixture of
   a) one or more alkoxylated alcohols of formula $$RO(C_2H_4O)_x(C_3H_6O)_yZ$$

wherein R is straight or branched $C_8$–$C_{22}$ alkyl; x is 0 to about 25; y greater than 0 to about 50 and Z is H or a X residue of an organic acid of a formula—C(O)R', where R' is $C_1$–$C_4$ alkyl, and b) an effective emulsifying amount of one or more anionic surfactants, wherein the amount of anionic surfactants used is between about 0.01 and 10 percent by weight of the alkoxylated alcohol and said one or more anionic surfactants is selected from the group consisting of alcohol sulfates, alkyl alkoxy sulfates, Polyoxyalkylene Phosphate esters, dialkyl sulfosuccinates, and sulfosuccinic acid esters with ethoxylated alcohols.

8. The method of claim 7 wherein from about 0.01 lb/T to about 5.0 lb/T, based on polymer solids, of the aqueous emulsion is added to the pulp slurry.

9. The method of claim 7 wherein the alkoxylated alcohol has formula $$R_1R_2CHCH_2O(C_2H_4O)_x(C_3H_6O)_yZ$$

where $R_1$ and $R_2$ are independently $C_6$–$C_{18}$ alkyl; x is 0 to about 25; y is greater than 0 to about 50 and Z is H or the residue of an organic acid.

10. The method of claim 7 wherein R is straight or branched $C_8$–$C_{22}$ alkyl; x is 0 to 5; and y is greater than 0 to about 25.

11. The method of claim 7 wherein the aqueous emulsion contains from about 0.5 to about 20 weight percent of the mixture of alkoxylated alcohols and anionic surfactants.

12. A method of inhibiting foaming in a papermaking process comprising adding to the pulp slurry prior to sheet formation an effective foam inhibiting amount of an aqueous emulsion containing from about 0.1 to about 70 weight percent of a mixture of a) one or more alkoxylated alcohols of formula $$RO(C_2H_4O)_x(C_3H_6O)_yZ$$

wherein R is straight or branched $C_8$–$C_{22}$ alkyl; x is 0 to about 25; y greater than 0 to about 50 and Z is H or the residue of an organic acid, and b) an effective emulsifying amount of one or more polyoxyalkylene phosphate esters.

13. The method of claim 12 wherein the polyoxyalkylene phosphate ester is the phosphate ester of ethoxylated tridecyl alcohol.

* * * * *